US010404628B2

(12) United States Patent
Lanka et al.

(10) Patent No.: US 10,404,628 B2
(45) Date of Patent: Sep. 3, 2019

(54) SYSTEMS AND METHODS FOR PROVIDING REQUESTED USER INFORMATION TO A VALIDATED USER

(71) Applicant: Verizon Patent and Licensing Inc., Arlington, VA (US)

(72) Inventors: Sreeharsha Lanka, Bridgewater, NJ (US); Prasanna Rajagopal, Edison, NJ (US); Alex Papadopolo, Morristown, NJ (US); Ramakrishnan Muthukrishnan, Raritan, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 43 days.

(21) Appl. No.: 15/447,683

(22) Filed: Mar. 2, 2017

(65) Prior Publication Data

US 2018/0255004 A1   Sep. 6, 2018

(51) Int. Cl.
*H04W 4/00* (2018.01)
*H04L 12/58* (2006.01)
*H04L 29/08* (2006.01)
*H04L 29/06* (2006.01)

(52) U.S. Cl.
CPC .............. *H04L 51/02* (2013.01); *H04L 67/02* (2013.01); *H04L 67/26* (2013.01); *H04L 63/0853* (2013.01)

(58) Field of Classification Search
USPC ................ 709/217, 204; 715/234; 455/456.1
See application file for complete search history.

(56) References Cited

U.S. PATENT DOCUMENTS

| | | | | |
|---|---|---|---|---|
| 9,401,993 | B1* | 7/2016 | van Rensburg | H04M 3/5233 |
| 9,503,452 | B1* | 11/2016 | Kumar | H04L 67/306 |
| 9,660,974 | B2* | 5/2017 | Grajek | H04L 63/0815 |
| 9,953,094 | B2* | 4/2018 | Miura | G06F 17/30876 |
| 10,187,431 | B2* | 1/2019 | Hancock | H04L 65/1069 |
| 2003/0087648 | A1* | 5/2003 | Mezhvinsky | H04W 4/02 455/456.1 |
| 2011/0264992 | A1* | 10/2011 | Vishria | G06F 17/30887 715/208 |
| 2014/0164909 | A1* | 6/2014 | Graff | G06F 17/30899 715/234 |
| 2014/0337424 | A1* | 11/2014 | Lee | H04L 63/0823 709/204 |
| 2015/0229699 | A1* | 8/2015 | Liu | H04L 69/14 709/217 |
| 2017/0289796 | A1* | 10/2017 | Raleigh | H04W 12/04 |
| 2017/0308883 | A1* | 10/2017 | Black | G06Q 20/206 |
| 2019/0052731 | A1* | 2/2019 | Bao | H04L 67/34 |

* cited by examiner

*Primary Examiner* — David Q Nguyen

(57) ABSTRACT

A method may include receiving, via a voice channel and from a user device associated with a user, a request for information regarding a service provided to the user by a provider and determining whether the user device is configured to receive push notifications. The method may also include determining whether the user device is associated with a current customer of the provider, generating a link and an authorization token, in response to determining that the user device is not configured to receive push notifications and that the user device is associated with a current customer, and forwarding the link and the authorization token to the user device. The method may further include receiving an indication of a selection of the link via the user device and providing the requested information to the user device in response to receiving the indication of the selection of the link.

20 Claims, 11 Drawing Sheets

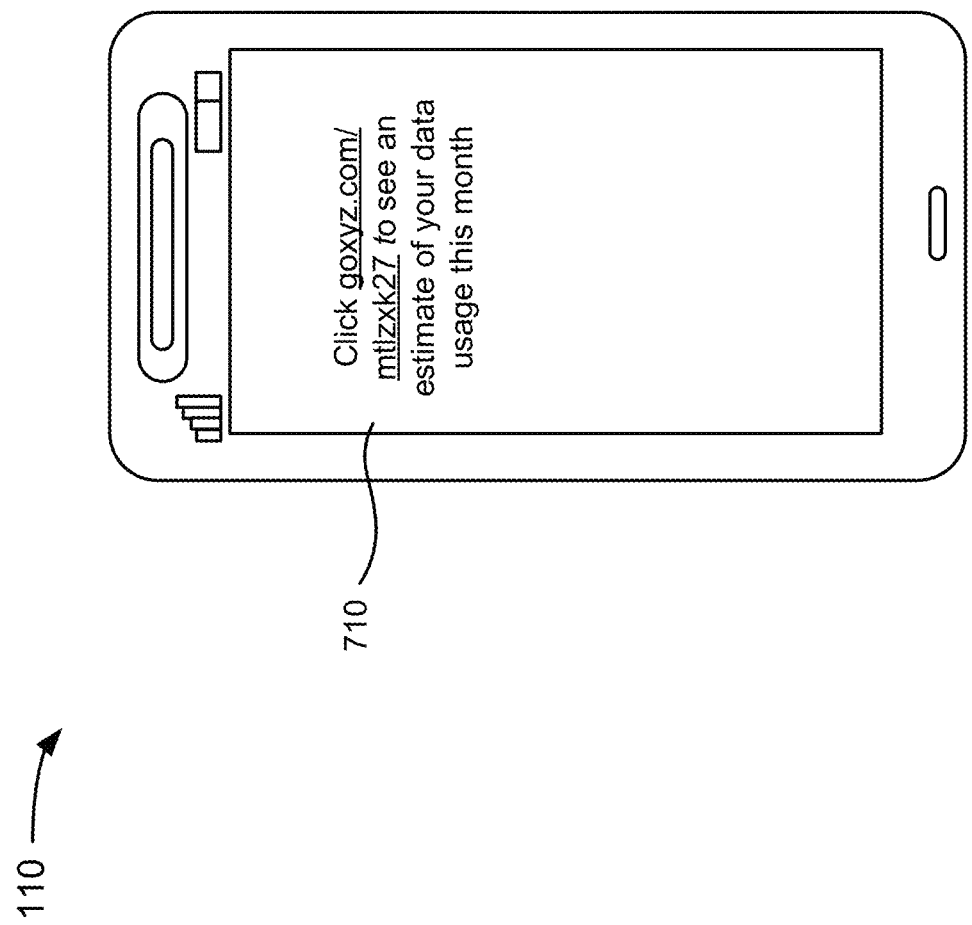

SYSTEMS AND METHODS FOR PROVIDING REQUESTED USER INFORMATION TO A VALIDATED USER

BACKGROUND INFORMATION

Customers of various services often access information from the service providers via interactive voice response (IVR) systems. For example, a customer may call a particular telephone number, interact with an IVR system via voice communications and obtain the desired information. However, when the desired information is relatively lengthy or involves multiple pieces of information, it is often difficult for the customer to easily obtain all of the desired information via voice responses from the IVR system. Service providers may also send electronic communications, such as email messages or text messages, to customers' mobile devices to provide information of interest. For example, a service provider may send a text message to a customer at the end of a billing cycle with information identifying the amount owed for the month. However, when customers are looking for particular information regarding their account, it is often difficult for the customers to obtain the desired information in an efficient manner via a text message.

BRIEF DESCRIPTION OF THE DRAWINGS

FIGS. 7A-7D illustrate information displayed by the user device of FIG. 1 in accordance with exemplary implementations.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein relate to providing information to validated users in a secure manner. In an exemplary implementation, a user wishing to access information (e.g., information associated with the user, such as medical information, financial information, travel information, etc., information associated with the user's account, subscription, order, etc.) may contact a service provider via a voice channel or telephone call. The service provider may then steer the user to a digital platform or application in which the information of interest is available. As used herein, the term "service provider" is not limited to any specific service and may encompass many fields and services (e.g., communications, medical, financial, transportation, travel, etc.). For example, the service provider or an entity associated with the service provider may determine whether the device via which the user contacted the service provider is configured to receive push notifications. If the user's device is not configured to receive push notifications, the service provider may send an electronic message (e.g., a text message) to the user's device along with a link for the user to access a web site or application via which the information of interest can be obtained. In this manner, voice callers are steered to a digital application/platform and obtain the information without the need for human intervention and in a secure manner. In addition, by steering users toward the digital platform, it is more likely that the user will obtain the information without the need for follow-up telephone calls/communications, human interaction, etc., thereby reducing congestion/delays at the service provider's support system, reducing overall network traffic, increasing security and improving customer satisfaction. Still further, by steering the caller to the digital platform, options for additional services, upgrades to existing services, etc., may be provided to the caller, thereby further enhancing the customer's experience.

Figure 1:
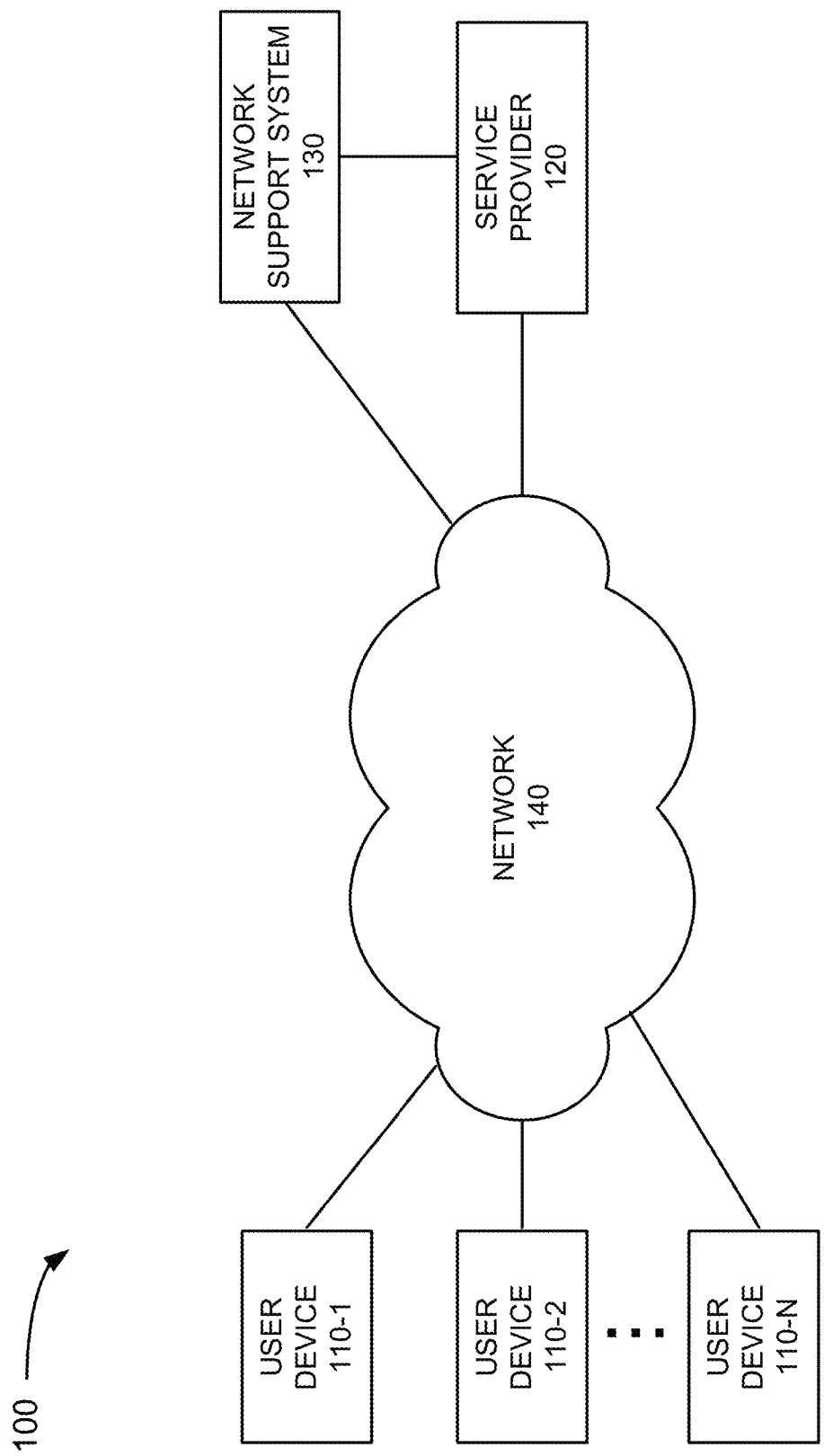
FIG. 1 illustrates an exemplary environment in which systems and methods described herein may be implemented.

FIG. 1 is a block diagram of an exemplary environment 100 in which systems and methods described herein may be implemented. Environment 100 may include user devices 110-1 through 110-N, service provider 120, network support system (NSS) 130 and network 140.

User devices 110-1 through 110-N (individually referred to as user device 110-x or 110 and collectively as user devices 110) may include a mobile device, such as wireless or cellular telephone device (e.g., a conventional cell phone with data processing capabilities), a smart phone, a personal digital assistant (PDA) that can include a radiotelephone, etc. In another implementation, user devices 110 may include any type of mobile computer device or system, such as a personal computer (PC), a laptop, a tablet computer, a notebook, a netbook, a wearable computer (e.g., a wrist watch, eyeglasses, etc.), a game playing device, a music playing device, a home appliance device, a home monitoring device, etc., that may include communication functionality. User devices 110 may connect to network 140 and other devices in environment 100 (e.g., service provider 120, NSS 130, etc.) via any conventional technique, such as wired, wireless, optical connections or a combination of these techniques. User device 110 and the person associated with user device 110 (e.g., the party holding or using user device 110) may be referred to collectively as user device 110 in the description below.

Service provider 120 may include one or more computer devices and systems associated with providing services via network 140. For example, in one implementation, service provider 120 may be an entity that provides wireless services, such as cellular telephone and data services to user devices 110 via network 140. In other implementations, service provider 120 may provide other types of services, such as banking or financial services, medical or dental services, transportation or shipping services, other types of communications services, etc.). In still other implementations, service provider 120 may be an entity via which a user purchases goods, such as an online retailer. In this example, assume that service provider 120 stores information regarding service plans for a large number of subscribers (also referred to herein as customers) and track cellular phone usage and data usage for each subscriber over a period of time (e.g., one month). Service provider 120 may communicate with user devices 110 and/or NSS 130 to provide customers with access to requested information, as described in detail below. In other implementations, service provider 120 may be a doctor or medical facility that stores patient data, a financial or banking entity that stores financial/banking information for customers, etc.

NSS 130 may include one or more computing devices or systems that act as a back-end for service provider 120 to facilitate operations of network 140. For example, NSS 130 may store subscriber information such as amount of data used per month/billing cycle, amount of voice minutes used per month, etc. NSS 130 may interact with service provider 120 to provide customers with information regarding their accounts. For example, NSS 130 may communicate with base stations, eNodeBs, gateways, etc., to provide messages, links, etc., to user devices 110. NSS 130 may also respond to queries from service provider 120 to identify types of notifications to be forwarded to user devices 110 based on the particular types of user devices 110, as described in more detail below.

Network 140 may include one or more wired, wireless and/or optical networks that are capable of receiving and transmitting data, voice and/or video signals. For example, network 140 may include one or more public switched telephone networks (PSTNs) or other type of switched network. Network 140 may also include one or more wireless networks and may include a number of transmission towers for receiving wireless signals and forwarding the wireless signals toward the intended destination. Network 140 may further include one or more satellite networks, one or more packet switched networks, such as an Internet protocol (IP) based network, a local area network (LAN), a wide area network (WAN), a personal area network (PAN), a WiFi network, a Bluetooth network, an intranet, the Internet, or another type of network that is capable of transmitting data. Network 140 provides wireless packet-switched services and wireless Internet protocol (IP) connectivity to user devices 110 to provide, for example, data, voice, and/or multimedia services.

The exemplary configuration illustrated in FIG. 1 is provided for simplicity. It should be understood that a typical environment may include more or fewer devices than illustrated in FIG. 1. For example, environment 100 may include a large number (e.g., thousands or more) of user devices 110 and multiple services providers 120 and NSSs 130. In addition, environment 100 (e.g., network 140) may include additional elements, such as eNodeBs, base stations, switches, gateways, routers, monitoring devices, etc., that aid in routing data and providing information of interest.

Various functions are described below as being performed by particular components in environment 100. In other implementations, various functions described as being performed by one device may be performed by another device or multiple other devices, and/or various functions described as being performed by multiple devices may be combined and performed by a single device.

Figure 2:
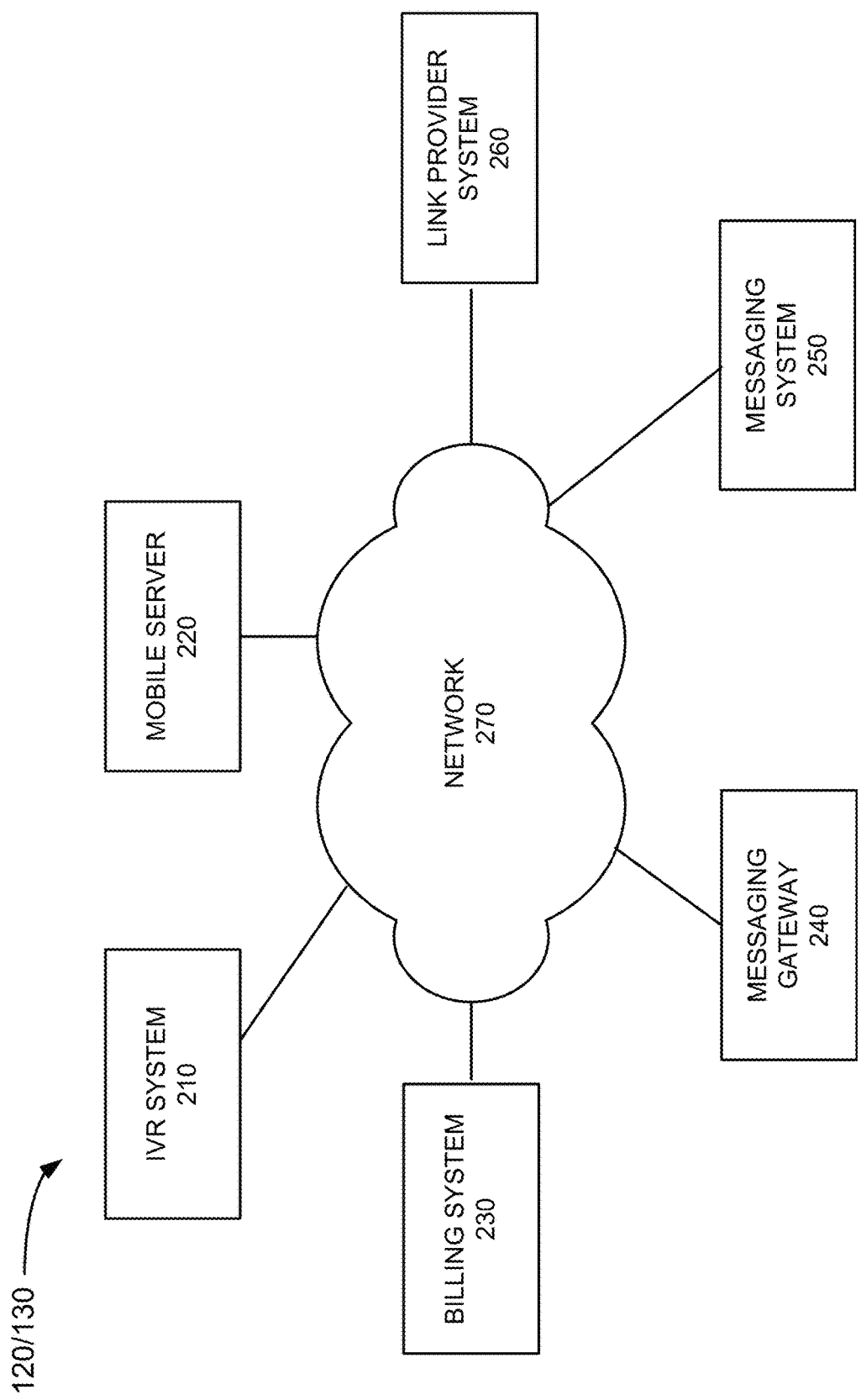
FIG. 2 illustrates an exemplary configuration of components implemented in one or more of the elements of FIG. 1.

FIG. 2 is an exemplary block diagram illustrating a portion of environment 100. In the implementation depicted in FIG. 2, service provider 120 and/or NSS 130 include IVR system 210, mobile server 220, billing system 230, messaging gateway 240, messaging system 250 and link provider system 260, interconnected via network 270.

IVR system 210 may be an interactive voice response system associated with service provider 120. IVR system 210 may be accessed by user devices 110 via a telephone call or an Internet connection to attempt to obtain information of interest. For example, a user may wish to determine how much data he/she has left on the user's account for the current billing cycle. Alternatively, the user may wish to view his/her banking or financial records, such as checking account balance, savings account balance, recently processed checks, investment information, etc. In another implementation, the user may wish to view his/her recent doctor visits, hospital visits, prescription information, etc. In still another implementation, the user may wish to view his/her travel information, such as flight information, hotel reservation information, rental car information, etc. In each case, IVR system 210 may receive the telephone call, use speech recognition and provide interactive voice prompts or text prompts to the caller to identify the information that the customer is attempting to obtain. In an exemplary implementation, IVR system 210 may interact with other components illustrated in FIG. 2 to steer the voice caller to a digital platform where the information of interest may be obtained in a more efficient manner for the caller, as described in detail below.

Mobile server 220 may include one or more computing devices or systems that provide services associated with user devices 110 (e.g., mobile devices). For example, mobile server 220 may interact with IVR system 210 and other components illustrated in FIG. 2 to provide a link to a digital platform where the information of interest may be obtained in a secure manner. Mobile server 220 may also store a mobile application that can be used by user devices 110 to obtain information of interest. For example, users may download a software application from mobile server 220 to load onto their user devices 110 to obtain information of interest.

Billing system 230 may include one or more computing devices or systems that provide back-end services for service provider 120. For example, billing system 230 may store information regarding customers' accounts, subscription plans, monthly data usage levels, monthly voice minutes and text messages, etc. In one implementation, billing system 230 may be used to verify that a caller requesting information is a current customer of service provider 120.

Messaging gateway 240 may include one or more computing devices that provide messages, such as short message service (SMS) messages or other types of text messages, to user devices 110 and other components illustrated in FIG. 2. In one implementation, messaging gateway 240 may interface with IVR system 210 and provide information to IVR system 210 indicating whether a particular user device 110 is configured to receive push notifications.

Messaging system 250 may include one or more computing devices or applications executed by a computing device to provide messages, such as text messages, to user devices. For example, messaging system 250 may interface with IVR system 210 and link provider system 260 to provide a message, along with a link and authorization token to user devices 110 so that user devices 110 may be able to obtain information of interest in a secure manner.

Link provider system 260 may include one or more computing devices or applications executed by a computing device to generate information for accessing information of interest. In one implementation, link provider system 260 may include a software application that receives a uniform resource locator (URL) and generates a shortened version of the URL that is more appropriate for display on user devices 110. The shortened URL may be forwarded to the user device 110 to enable the user to select the shortened URL and obtain the information of interest.

Network 270 may be an internal company network, such as a local area network or a wide area network, that includes wired, wireless and/or optical connections between the elements illustrated in FIG. 2. In other implementations, the devices illustrated in FIG. 2 may be directly coupled together, or coupled together via an external network, such as the Internet.

Although FIG. 2 shows exemplary components of service provider 120 and/or NSS 130, in other implementations, network provider 120 and/or NSS 130 may include fewer components, different components, differently arranged components, or additional components than depicted in FIG. 2. For example, one or more components of service provider 120 and NSS 130 may perform functions described as being performed by one or more other components. In addition, in some implementations, the elements illustrated in FIG. 2 may be modules executed by a single computing device, system or platform that performs the processes described below.

Figure 3:
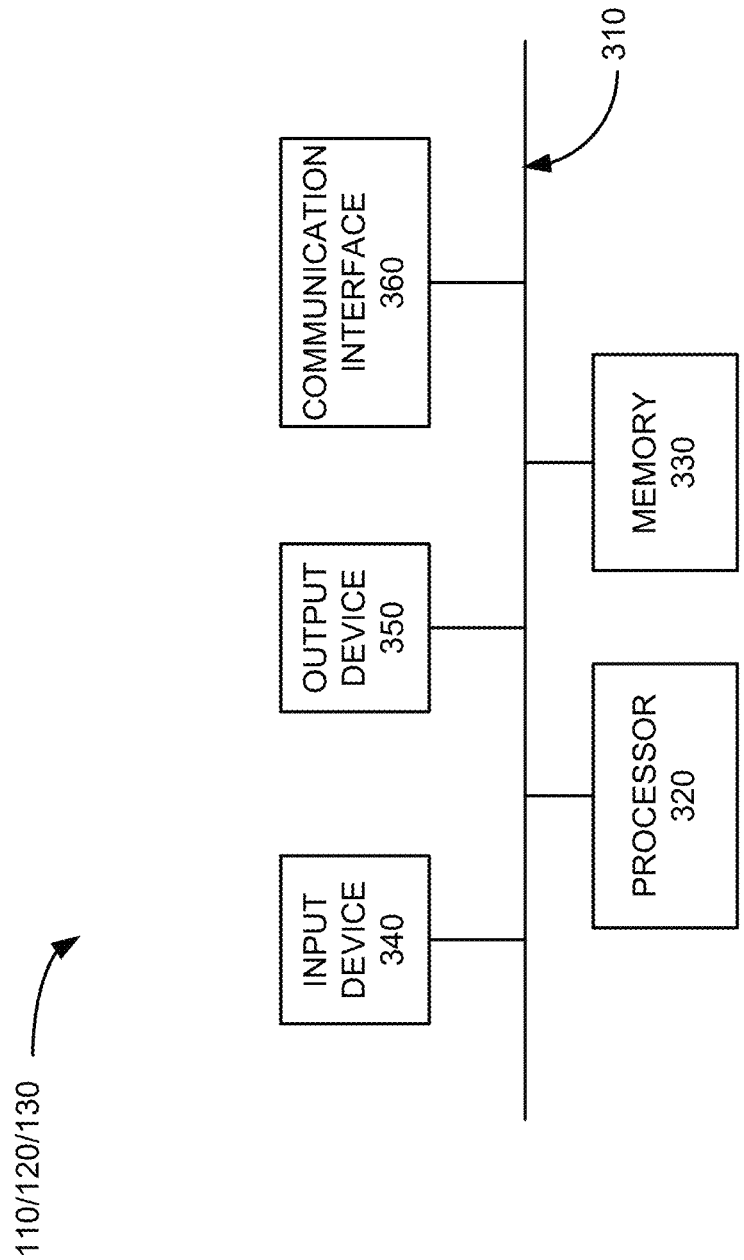
FIG. 3 illustrates an exemplary configuration of logic components included in one or more of the devices of FIGS. 1 and 2.

FIG. 3 illustrates an exemplary configuration of service provider 120. Other devices in environment 100, such as user device 110, NSS 130, IVR system 210, mobile server 220, billing system 230, messaging gateway 240, messaging system 250 and link provider system 260 may be configured in a similar manner. Referring to FIG. 3, service provider 120 may include bus 310, processor 320, memory 330, input device 340, output device 350 and communication interface 360. Bus 310 may include a path that permits communication among the elements of service provider 120.

Processor 320 may include one or more processors, microprocessors, or processing logic that may interpret and execute instructions. Memory 330 may include a random access memory (RAM) or another type of dynamic storage device that may store information and instructions for execution by processor 320. Memory 330 may also include a read only memory (ROM) device or another type of static storage device that may store static information and instructions for use by processor 320. Memory 330 may further include a solid state drive (SDD). Memory 330 may also include a magnetic and/or optical recording medium (e.g., a hard disk) and its corresponding drive.

Input device 340 may include a mechanism that permits a user to input information, such as a keyboard, a keypad, a mouse, a pen, a microphone, a touch screen, voice recognition and/or biometric mechanisms, etc. Output device 350 may include a mechanism that outputs information to the user, including a display (e.g., a liquid crystal display (LCD)), a printer, a speaker, etc. In some implementations, a touch screen display may act as both an input device and an output device.

Communication interface 360 may include one or more transceivers that service provider 120 (or user device 110, NSS 130 or elements in FIG. 2) uses to communicate with other devices via wired, wireless or optical mechanisms. For example, communication interface 360 may include one or more radio frequency (RF) transmitters, receivers and/or transceivers and one or more antennas for transmitting and receiving RF data via network 140. Communication interface 360 may also include a modem or an Ethernet interface to a LAN or other mechanisms for communicating with elements in a network, such as network 140 or another network.

The exemplary configuration illustrated in FIG. 3 is provided for simplicity. It should be understood that service provider 120 (or user devices 110, NSS 130, IVR system 210, mobile server 220, billing system 230, messaging gateway 240, messaging system 250 and link provider system 260) may include more or fewer devices than illustrated in FIG. 3. In an exemplary implementation, service provider 120 (or other device in environment 100 or FIG. 2) performs operations in response to processor 320 executing sequences of instructions contained in a computer-readable medium, such as memory 330. A computer-readable medium may be defined as a physical or logical memory device. The software instructions may be read into memory 330 from another computer-readable medium (e.g., a hard disk drive (HDD), SSD, etc.), or from another device via communication interface 360. Alternatively, hard-wired circuitry may be used in place of or in combination with software instructions to implement processes consistent with the implementations described herein. Thus, implementations described herein are not limited to any specific combination of hardware circuitry and software.

Figure 4:
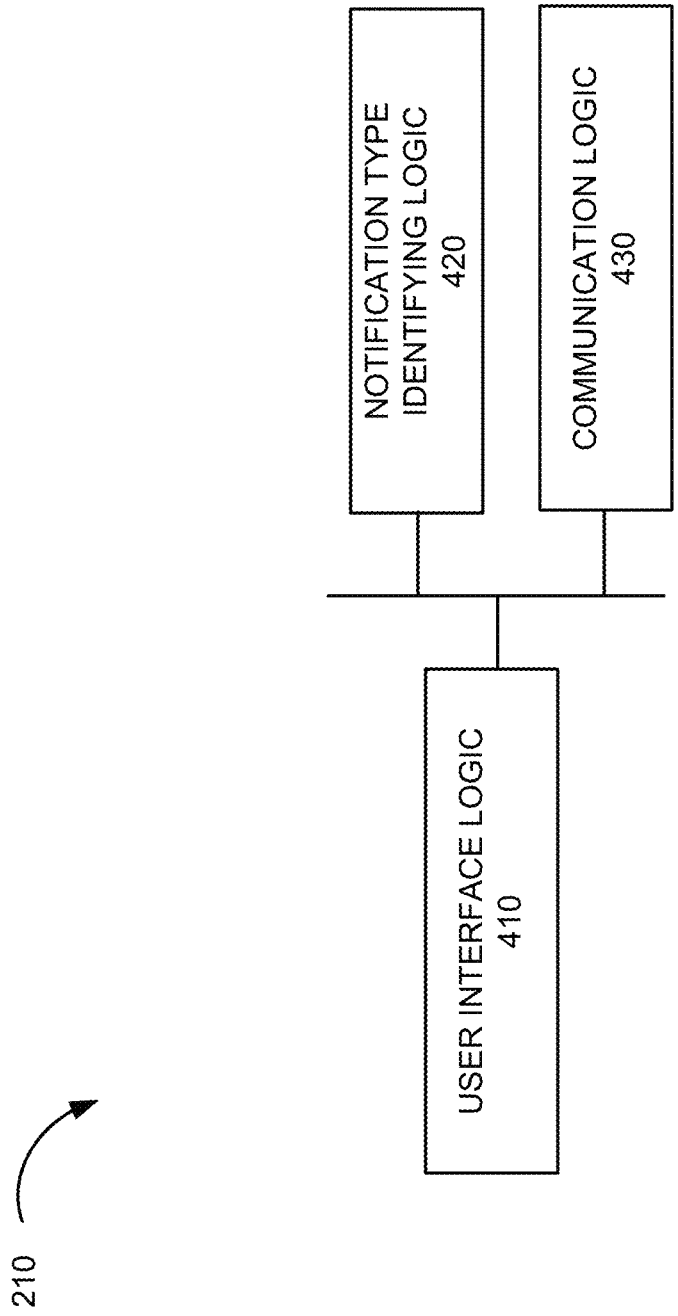
FIG. 4 illustrates an exemplary configuration of logic components implemented in one of the devices of FIG. 2.

FIG. 4 is an exemplary functional block diagram of components implemented in IVR system 210. In an exemplary implementation, all or some of the components illustrated in FIG. 4 may be implemented by processor 320 executing software instructions stored in memory 330.

IVR system 210 may include user interface logic 410, notification type identifying logic 420 and communication logic 430. In alternative implementations, these components or a portion of these components may be located externally with respect to IVR system 210.

User interface logic 410 may include voice portal logic to interface with customers contacting service provider 120. For example, calls to service provider 120, such as calls requesting information, may be received by IVR system 210. User interface logic 410 may include speech recognition logic to identify the requested information and provide voice prompts to user device 110 in response to requests.

Notification type identifying logic 420 may include logic to identify the particular type of notification to be used for providing information to the user device 110 that contacted service provider 120. For example, notification type identifying logic 420 may determine whether the user device 110 contacting IVR system 210 is a mobile device that is capable of receiving push notifications, whether the user device 110 has a particular software application (associated with the user's subscription to services provided by service provider 120) installed on user device 110, whether user device 110 is a stationary device, such as a personal computer, etc. In one implementation, notification type identifying logic 420 may interface with messaging gateway 240 to determine the relevant information, as described in detail below Communication logic 430 may include logic to provide voice information to user devices 110. For example, communication logic 430 may provide audible information to user devices 110 with respect to requested information. Communication logic 430 may also provide messages to other devices illustrated in FIG. 2, such as messages to obtain a link and other information for allowing user devices 110 to obtain information of interest via a digital platform, as opposed to a voice channel, as described in detail below.

Although FIG. 4 shows exemplary components of IVR system 210, in other implementations, IVR system 210 may include fewer components, different components, differently arranged components, or additional components than depicted in FIG. 4. In addition, functions described as being performed by one of the components in FIG. 4 may alternatively be performed by another one or more of the components of IVR system 210.

Figure 5A:
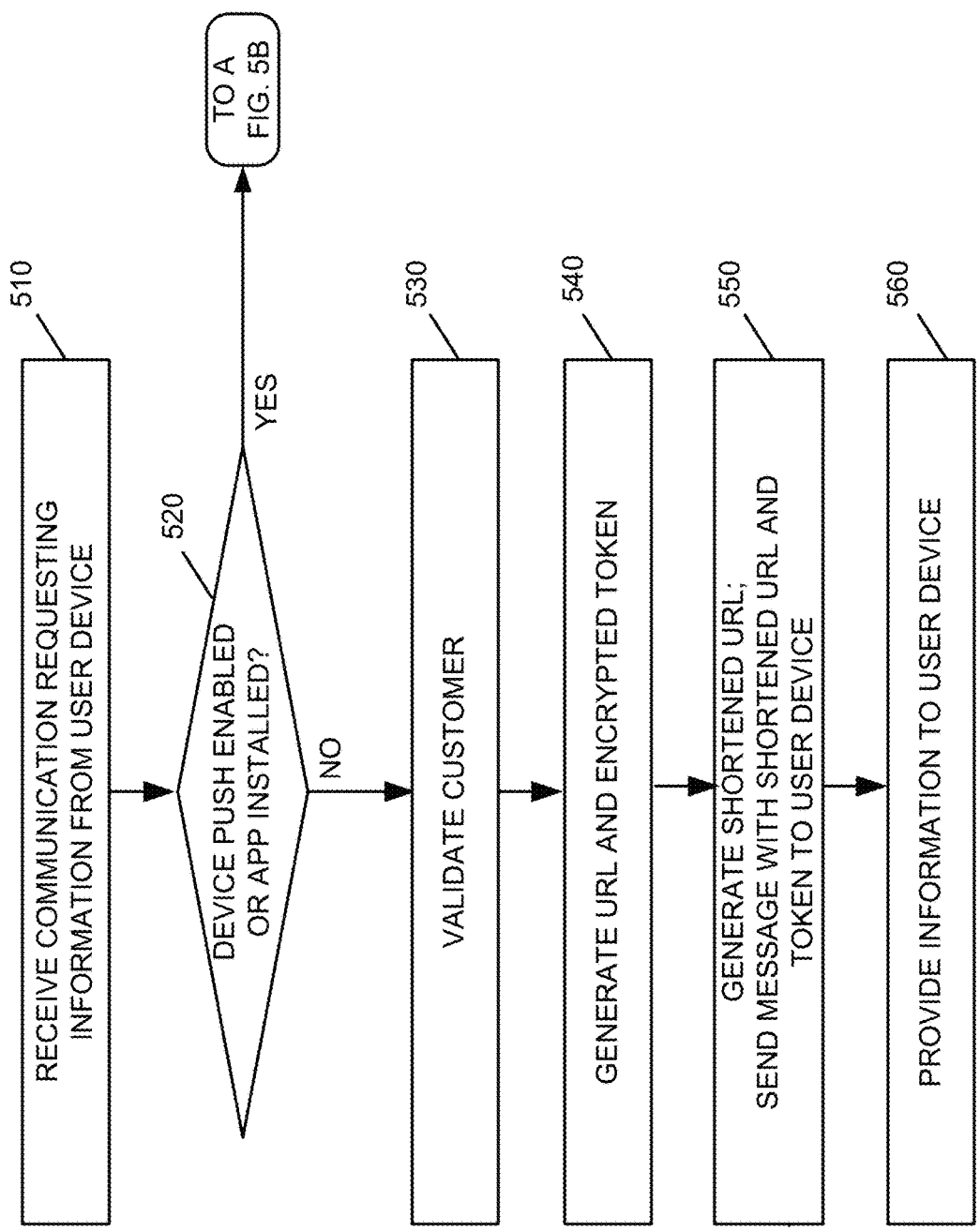
FIGS. 5A and 5B are flow diagrams illustrating processing by various components illustrated in FIGS. 1 and 2 in accordance with an exemplary implementation.
Figure 5B:
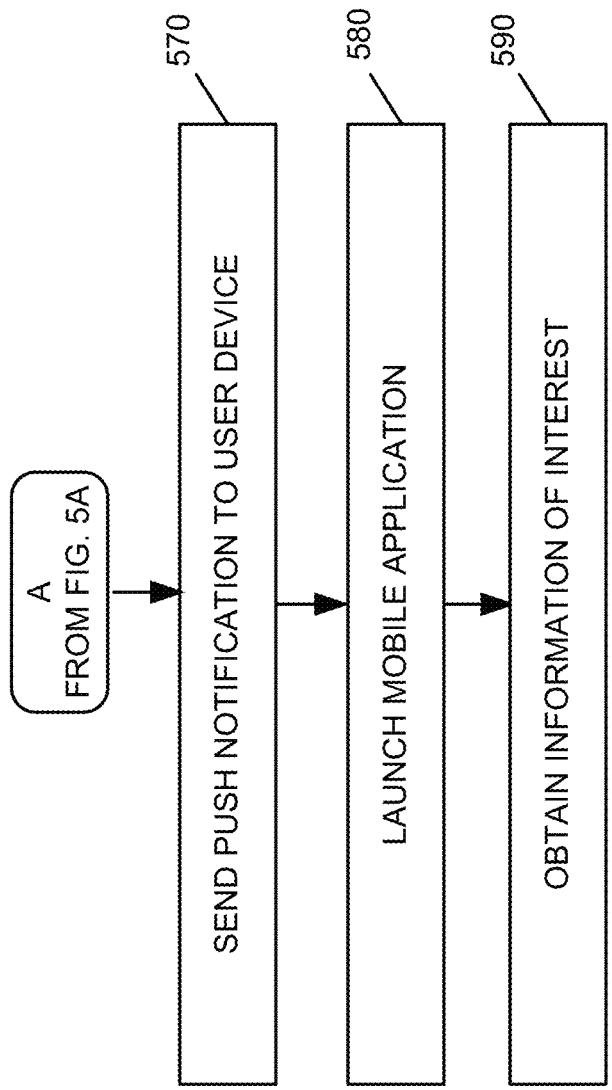

FIGS. 5A and 5B are flow diagrams illustrating processing associated with providing information of interest to user devices 110. The flow diagram of FIG. 5A is described in conjunction with the signal flow diagram of FIG. 6. Processing may begin with IVR system 210 receiving a communication from user device 110 (block 510). For example, a customer at user device 110 may dial a particular telephone number (e.g., 800-555-1212, #DATA, or #3282) provided by service provider 120 for customers to obtain information regarding their accounts (FIG. 6, signal 610).

IVR system 210 receives the call and interacts with the caller via voice prompts and using speech recognition determines the purpose of the customer's call. In this case, assume that the customer interacts with IVR system 210 via voice commands and indicates that he/she wishes to receive information about his/her wireless cellular service and data plan provided by service provider 120. IVR system 210 may then determine whether the calling user device 110 is eligible for push notifications or whether the calling user device 110 includes a software application for obtaining information about the caller's account (block 520).

Figure 6:
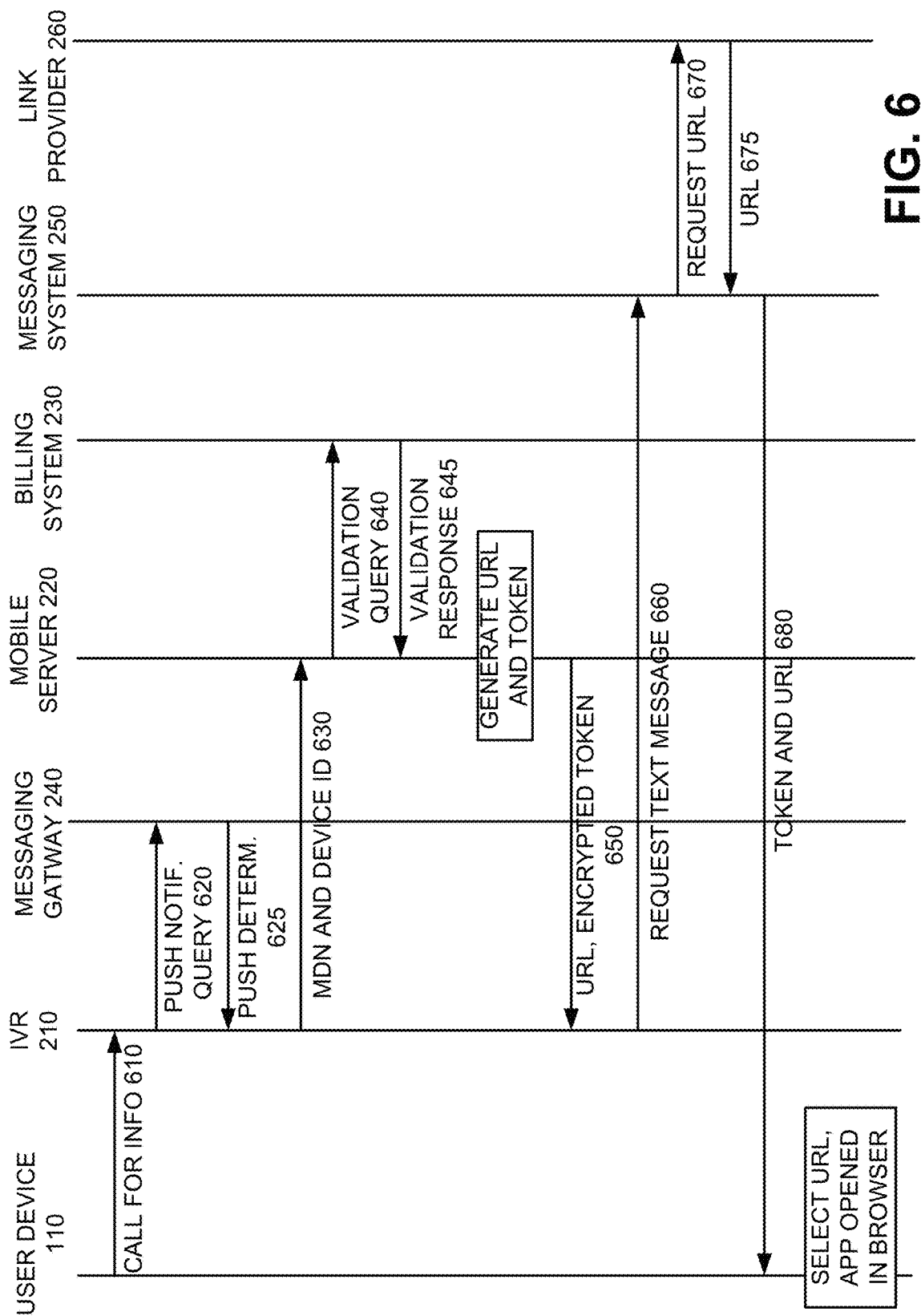
FIG. 6 is a signal flow diagram associated with the processing of FIG. 5A.

For example, notification type identifying logic 420 may use the mobile directory number (MDN) received for the calling user device 110 and send a query to messaging gateway 240 to determine whether the particular user device 110 is eligible to receive push notifications (FIG. 6, signal 620). In an exemplary implementation, messaging gateway 240 may store a database including information indicating whether each user device 110 is push notification-eligible. This information may be stored and updated by personnel associated with service provider 120 when customers register for new data or cellular service, add a new mobile device to an existing service, etc. In addition, messaging gateway 240 may store information indicating whether user devices 110 include a software application provided by service provider 120 for accessing customer account information. Customers may download and install the application on their user devices 110, or the application may come pre-installed on their user devices 110, to obtain information of interest. However, in some situations, customers may have to enable a push notifications feature associated with the mobile application in order for service provider 120 to provide push notifications to the user device 110. When the customer enables push notifications, service provider 120 may receive an indication that user device 110 is push notification-eligible and store this information, for example, in a database at messaging gateway 240 or a database accessible to messaging gateway 240.

Messaging gateway 240 receives the query and determines if the calling user device 110 is push notification enabled, if the calling user device 110 includes the software application for obtaining information of interest, and/or if the user has enabled the push notification feature for the mobile application stored on user device 110. Messaging gateway 240 sends a message to IVR system 210 with the result of the determination (FIG. 6, 625). If user device 110 is not eligible to receive push notifications or if user device 110 does not include the software application which is also push notification enabled (block 520—no), IVR system 210 may validate the customer (block 530).

For example, IVR system 210 signals mobile server 220 with the mobile directory number (MDN) and a device identifier (ID) associated with user device 110 (FIG. 6, 630). Mobile server 220 may then send a validation or verification query to billing system 230 to determine whether the MDN and device ID match corresponding information for a current subscriber/customer (FIG. 6, 640). Billing system 230 searches customer accounts using the MDN and device ID and sends a validation response to mobile server 220 (FIG. 6, 645). In this case, assume that the response indicates that the MDN and device ID are associated with a current customer.

Mobile server 220 may then generate a uniform resource locator (URL) and an encrypted token for use in obtaining the information of interest for the customer (block 540). The generated URL may be associated with a digital platform, such as a web site associated with service provider 120, in which the user may obtain the information of interest. Mobile server 220 may also generate an encrypted token to ensure that requests from the user device 110 are authentic. For example, in one implementation, mobile server 220 may use the advanced encryption system (AES) 256 algorithm to create the authentication token using the MDN and device ID of user device 110 along with a time stamp and "salt." The time stamp may identify the time at which the encryption token is created and may be used to provide an expiration time associated with obtaining the information of interest. For example, in one implementation, the time stamp may provide the user with a predetermined amount of time for accessing the information of interest (e.g., 15 minutes, 5 minutes, or some other longer or shorter period of time). The salt, or random data, may be added to the AES 256 algorithm to provide added security for the authentication token.

Mobile server 220 may then send the URL and encrypted token to IVR system 210 (FIG. 6, 650). IVR system 210 receives the URL and encrypted token and may contact messaging system 250 to request a text message, such as a short message service (SMS) message, and a shortened URL based on the URL generated by mobile server 220 (FIG. 6, 660). Messaging system 250 receives the request and forwards a request for a shortened URL to link provider system 260 (FIG. 6, 670). Link provider system 260 receives the request and generates a shortened version of URL (block 550). For example, link provider system 260 may map the URL generated by mobile server 220 to an abbreviated version that is more suitable for display on user device 110 via a text message. Link provider system 260 forwards the shortened URL to messaging system 250 (FIG. 6, 675).

Messaging system 250 may then send an SMS message with the shortened URL and the encrypted token to user device 110 via network 270 (block 550, FIG. 6, 680). User device 110 receives the SMS message including the token and URL. Assume that the user associated with user devices 110 accesses the received message and ends (e.g., hangs up) his/her voice call with IVR system 210. For example, referring to FIG. 7A, user device 110, corresponding to a smart phone device in this example, may select the received message to display message 710 via an output screen of user device 110. Message 710 may instruct the user to click/select the link (i.e., goxyz.com/mtlzxk27 in this example) to obtain an estimate of the user's data usage for the current month.

Assume that the user selects the link in message 710. The browser of user device 110 then contacts the web site corresponding to the link. The web site or service provider 120 may decrypt the received communication using a private key and determine whether information in the decrypted communication, such as the MDN and device ID match information stored by service provider 120. By checking the information in the decrypted communication, the web site or service provider 120 ensures that the request for information comes from a user/user device 110 that is authorized to receive the user information.

The web site or service provider 120 may also check the timestamp in the decrypted message to determine whether the link provided to user device 120 has expired. For example, as discussed above, the timestamp provided with the link may expire in 15 minutes, or some other period of time. In this manner, if an unauthorized user is somehow able to "spoof" the MDN and device ID of a user device 110 associated with a current customer, the timestamp may help ensure that an unauthorized user is not able to gain access to a user's information by providing an expiration period for the timestamp. That is, if the timestamp has expired, the web site or service provider 120 will not provide the information to user device 110. If service provider 120 determines that the link has not expired, service provider 120 may provide information to user device 110 regarding the user's account. For example, service provider 120 may provide information of interest to user device 110 that is automatically displayed by user device 110.

Figure 7B:
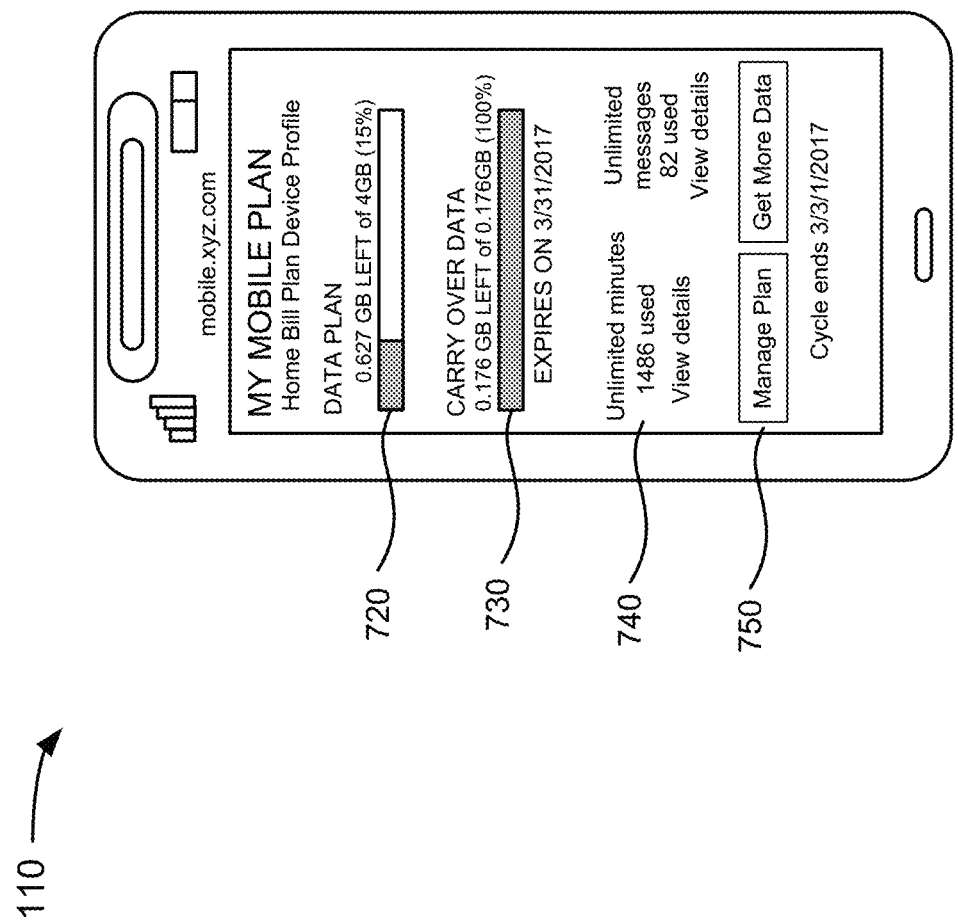

For example, in one implementation, selection of the link may open a mobile application associated with the customer's account in the web browser of user device 110 and provide the information of interest in a user-friendly format, as illustrated in FIG. 7B. Referring to FIG. 7B, user device 110 at area 720 may display text and graphics indicating how much data is left for the current billing cycle, area 730 may display both text and graphics indicating how much carry over data is left for the current billing cycle and an expiration date for the carry over data, area 740 may display how many minutes and messages have been used for the current billing cycle, and area 750 may display radio buttons for managing the user's plan and requesting more data. For example, by selecting the radio button "Get More Data," the user may purchase additional data for the current billing period. Similarly, by selecting the "Manage Plan" radio button, the user may make changes to his/her plan.

In this manner, user device 110 is automatically provided with information of interest without requiring the user to login to his/her account. That is, since service provider 120 decrypted the token which included user-specific information (e.g., an MDN and device ID), no login or other authentication is required to access the information of interest, thereby reducing message traffic between user device 110 and service provider 120. In addition, since the decrypted token includes the MDN and device ID of user device 110, the link with the token cannot be used by another device to obtain information about a customer's account since the MDN and device ID will not match the information included in the token, thereby enhancing security of the customer's information. Still further, including a timestamp with an expiration period with the link further enhances the security of the system by denying access to information when receiving an expired timestamp, which may come from a potentially malicious entity that is not authorized to receive the information.

If service provider 210 determines that the timestamp in the link has expired, service provider 120 may provide a second link/URL to user device 110. In one implementation, the second link may be associated with an interface or web page via which the user can provide login information to obtain access to information regarding the user's service. In other implementations, the second link/URL may be similar to the first link, but include a new timestamp. In this case, the user at user device 110 may select the link and receive the information illustrated in FIG. 7B.

Figure 7C:
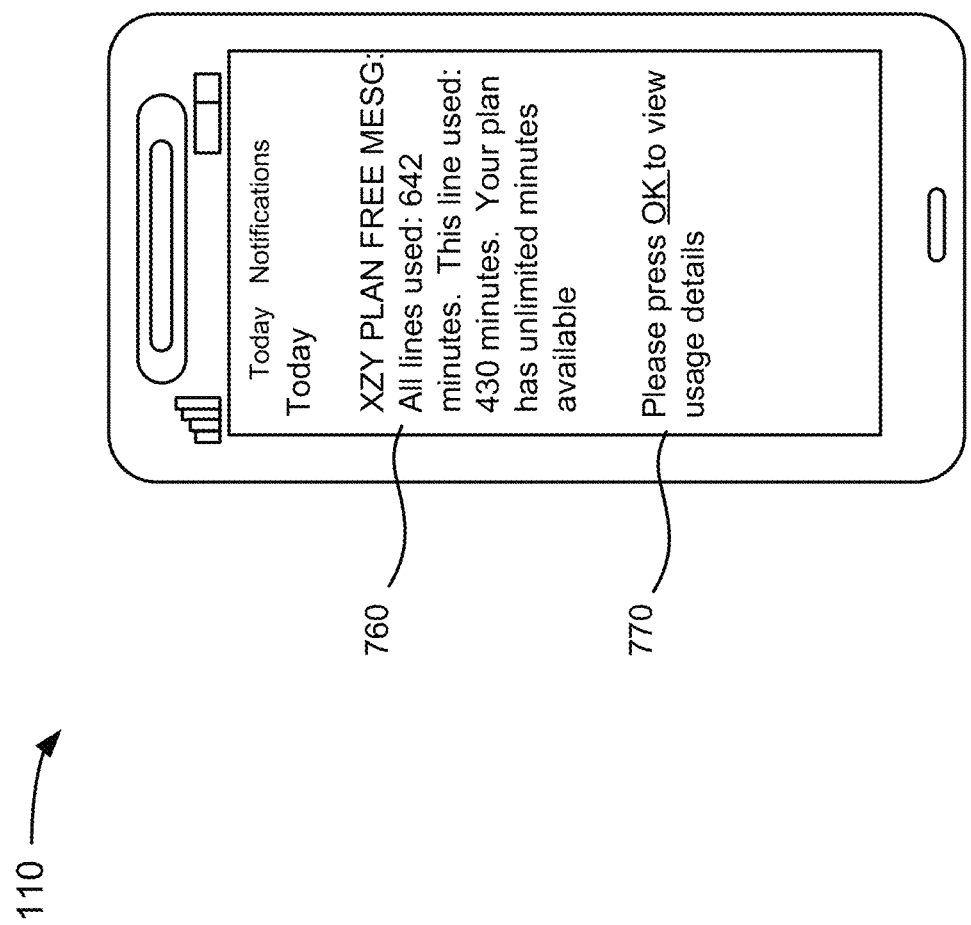

Referring back to FIG. 5A, if the user device 110 is push notification enabled or user device 110 includes the mobile application which is push notification enabled (block 520—yes), messaging gateway 240 may send a push notification to user device 110 (FIG. 5B, block 570). User device 110 receives the push notification and automatically displays the push notification. For example, user device 110 may display the push notification without any input from the user at user device 110, even if the screen of user device 110 is locked. In one implementation illustrated in FIG. 7C, the display of user device 110 may display a message at area 760 indicating how many minutes have been used by all lines in the customer's plan for the current billing cycle, how many minutes have been used by the line associated with user device 110 in the current billing cycle, the amount of minutes available in the current billing cycle (i.e., unlimited in this example), as well as other information of interest. For example, the push notification may include information indicating the amount of data used in the currently billing cycle, the amount of data left in the current billing cycle, etc. The push message may also include information at area 770 indicating that the customer may obtain additional information by pressing the OK link/button. In some implementations, if user device 110 is push notification enabled or user device 110 includes the mobile application which is push notification enabled, IVR system 210 or another element of environment 100 illustrated in FIG. 1 or 2 may validate that the user is authorized to receive a push notification before a push message is sent to user device 110. For example, IVR system 210 may determine that the MDN of the calling user device 110 matches the MDN of a current customer before messaging gateway 240 sends the push notification to user device 110.

Figure 7D:
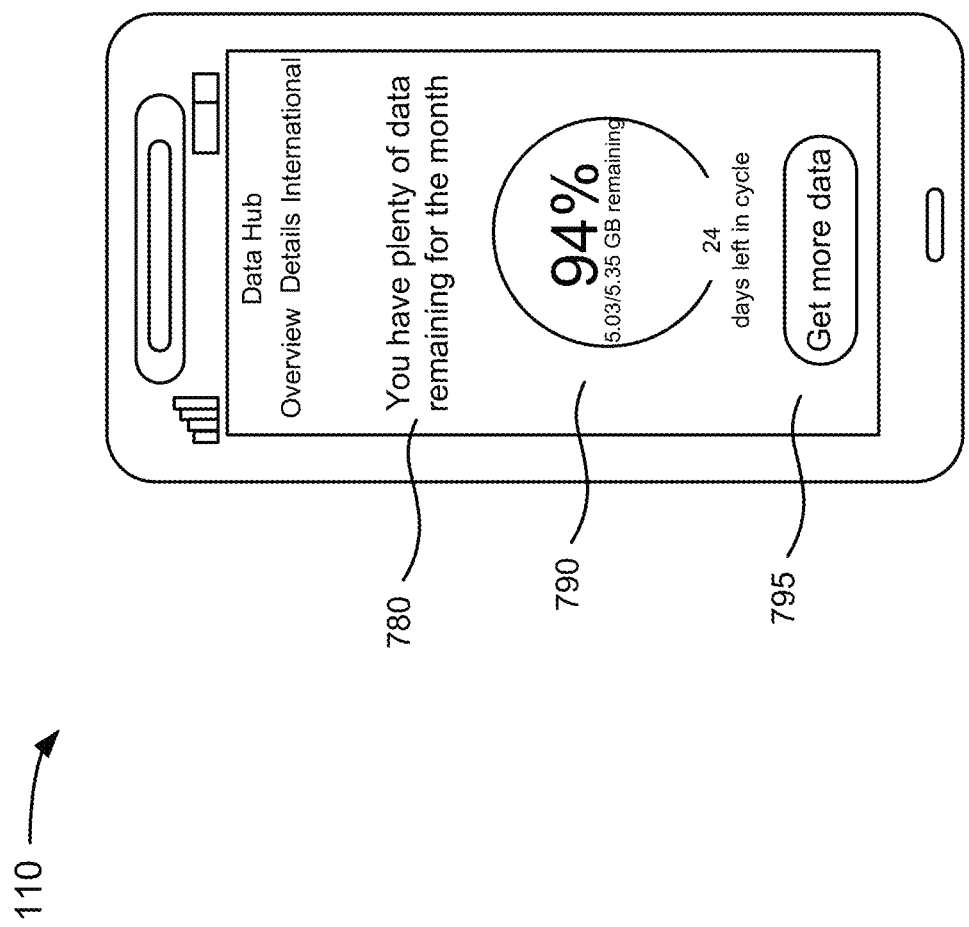

Assume that the user selects "OK" within the push notification to obtain more information. In this case, assume that user device 110 includes the software application provided by service provider 120 to allow customers to obtain information of interest. When the user selects the OK button/link, the selection automatically launches the software application stored by user device 110 (block 580). The mobile application may then display additional information of interest at user device 110 (block 590). For example, referring to FIG. 7D, user device 110 may display a message at area 780 regarding a relative amount of data left for the current billing cycle at area 780 (i.e., "plenty" of data remaining in this example), display text and graphics at area 790 indicating the particular percentage and amount of data left for the current billing cycle, as well as the number of days left in the current billing cycle, and display a radio button at area 795 that the user may select to obtain more data.

In the manner described above, user device 110 is able to display information of interest in a user-friendly format, regardless of whether user device 110 is configured to receive push notifications. That is, the user may receive a link to the information of interest, select the link and receive the information in a secure and easy to follow format when the user device 110 is not configured to receive push notifications, and the user receives push notifications that allow the user to launch a mobile application to receive the information of interest in a similarly easy to follow format.

Implementations described herein provide information of interest to users via a digital platform/system. Callers to a voice platform are steered to the digital platform/system to obtain the information of interest, as opposed to using the voice platform/channel. In situations where the calling user device 110 stores a software application provided by service provider 120 which is configured to receive push notifications, a push notification is automatically provided to the calling user device 110. If the calling user device 110 is not push notification enabled and/or does not include the software application provided by service provider 120, an encrypted message/link may be provided to the calling user device to easily obtain the information of interest. In each case, the communications are secure to avoid unauthorized access to the customer's account information. In addition, voice callers are able to obtain the information of interest via the digital platform/system without the need for human intervention or follow-up telephone calls/communications, thereby reducing congestion/delays at the service provider's support system and improving customer satisfaction.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, features have been described above with respect to receiving a call on a voice channel and providing information of interest on a digital channel. In other implementations, the original communication for information from user device 110 may be received on a digital channel, such as via a text communication to a contact center managed by service provider 120.

In addition, implementations described above refer to sending an SMS message with an encrypted token to user device 110. It should be understood that other types of electronic communications, such as enhanced messaging service (EMS) messages, messages sent via a wireless application protocol (WAP), etc., may be used to send the link and the encrypted token.

Further, while series of acts have been described with respect to FIGS. 5A and 5B and signal flows with respect to FIG. 6, the order of the acts and/or signal flows may be different in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
   receiving, via a voice channel and from a user device associated with a user, a request for information regarding a service provided to the user by a provider;
   determining whether the user device is configured to receive push notifications;
   determining whether the user device is associated with a current customer of the provider;
   generating a link and an authorization token, in response to determining that the user device is not configured to receive push notifications and that the user device is associated with a current customer of the provider, wherein generating the authorization token comprises encrypting the authorization token and including a timestamp for the authorization token;
   forwarding the link and the authorization token to the user device;
   receiving an indication of a selection of the link via the user device;
   providing the requested information to the user device in response to receiving the indication of the selection of the link;
   determining, based on a timestamp associated with the authorization token and prior to providing information regarding the service, whether the authorization token has expired; and
   providing, to the user device, a second link in response to determining that the authorization token has expired, wherein the second link is associated with an interface or web page via which the user can provide login information to obtain access to information regarding the service.

2. The method of claim 1, further comprising:
   decrypting, by the provider, the authorization token received from the user device using a private key to determine if information included in the authorization token matches information stored by the provider.

3. The method of claim 1, wherein the providing the requested information comprises:
   providing the requested information without requiring the user to provide login or account information.

4. The method of claim 1, further comprising:
   providing a push notification to the user device, in response to determining that the user device is configured to receive push notifications.

5. The method of claim 4, wherein the providing a push notification includes providing an option for the user to receive additional information via the push notification, the method further comprising:
   receiving selection of the option; and
   automatically launching a software application in response to receiving the selection.

6. The method of claim 1, wherein the generating an authorization token comprises:
   applying an encryption algorithm to information including a mobile directory number of the user device and a device identifier associated with the user device.

7. The method of claim 1, wherein the generating a link comprises:
   generating a uniform resource locator (URL) associated with the provider, wherein the URL is used to obtain the information regarding the service.

8. The method of claim 7, further comprising:
   mapping the URL to a shortened version of the URL; and
   providing the shortened version of the URL to the user device.

9. The method of claim 1, wherein determining whether the user device is configured to receive push notifications comprises:
   determining whether the user device includes an application to obtain the information regarding the service, and
   determining whether the user device has enabled push notifications for the application.

10. A system, comprising:
a memory; and
at least one device configured to:
receive, via a voice channel associated with an interactive voice response (IVR) system and from a user device associated with a user, a request for information regarding a service provided to the user by a provider associated with the IVR system,
access the memory to determine whether the user device is configured to receive push notifications,
determine whether the user device is associated with a current customer of the provider, and
wherein if the at least one device determines that the user device is not configured to receive push notifications and determines that the user device is associated with a current customer of the provider, the at least one device is further configured to:
generate a link and an authorization token,
forward, via a short message service (SMS) message, the link and the authorization token to the user device,
receive, responsive to the SMS message, an indication of a selection of the link via the user device, and
provide the requested information to the user device in response to receiving the indication of the selection of the link.

11. The system of claim 10, wherein when generating an authorization token, the at least one device is configured to:
encrypt the authorization token and include a timestamp for the authorization token.

12. The system of claim 11, wherein the at least one device is further configured to:
decrypt the authorization token received from the user device using a private key to determine if information included in the authorization token matches information stored by the provider.

13. The system of claim 12, wherein the at least one device is further configured to:
determine, based on the timestamp and prior to providing the requested information, whether the authorization token has expired.

14. The system of claim 10, wherein the at least one device is further configured to:
provide a push notification to the user device, in response to determining that the user device is configured to receive push notifications, wherein the push notification includes an option to receive additional information,
receive a selection of the option, and
automatically launch a software application in response to receiving the selection.

15. The system of claim 10, wherein when generating an authorization token, the at least one device is configured to:
apply an encryption algorithm to information including a mobile directory number of the user device and a device identifier associated with the user device.

16. The system of claim 10, wherein the at least one device is further configured to:
provide, to the user device, a second link in response to determining that the authorization token has expired, wherein the second link is associated with an interface or web page via which the user can provide login information to obtain access to information regarding the service.

17. A non-transitory computer-readable medium having stored thereon sequences of instructions which, when executed by at least one processor, cause the at least one processor to:
receive, via a voice channel associated with an interactive voice response (IVR) system and from a user device associated with a user, a request for information regarding a service provided to the user by a provider associated with the IVR system;
determine whether the user device is configured to receive push notifications;
determine whether the user device is associated with a current customer of the provider; and
wherein if the at least one processor determines that the user device is not configured to receive push notifications and determines that the user device is associated with a current customer of the provider, the instructions cause the at least one processor to:
generate a link and an authorization token;
forward, via a communication interface, the link and the authorization token to the user device in a short message service (SMS) message;
receive, responsive to the SMS message, an indication of a selection of the link from the user device; and
provide information to the user device regarding the service in response to receiving the indication of the selection of the link.

18. The non-transitory computer-readable medium of 17, wherein when determining whether the user device includes an application to obtain the information regarding the service, the instructions cause the at least one processor to:
determine whether the user device includes an application to obtain the information regarding the service, and
determine whether the user device has enabled push notifications for the application.

19. The non-transitory computer-readable medium of 17, wherein when providing the information to the user device, the instructions cause the at least one processor to:
provide the requested information without requiring the user to provide login or account information.

20. The non-transitory computer-readable medium of 17, wherein the instructions, when executed by the at least one processor, further cause the at least one processor to:
provide, to the user device, a second link in response to determining that the authorization token has expired, wherein the second link is associated with an interface or web page via which the user can provide login information to obtain access to information regarding the service.

* * * * *